(12) United States Patent
Clark et al.

(10) Patent No.: US 9,191,330 B2
(45) Date of Patent: Nov. 17, 2015

(54) PATH SELECTION FOR NETWORK SERVICE REQUESTS

(71) Applicant: International Business Machines Corporation, Armonk, NY (US)

(72) Inventors: Thomas K. Clark, Tuscon, AZ (US); Colin S. Dawson, Tuscon, AZ (US); Ramani R. Routray, San Jose, CA (US); Yang Song, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/080,054

(22) Filed: Nov. 14, 2013

(65) Prior Publication Data

US 2015/0134799 A1    May 14, 2015

(51) Int. Cl.
*G06F 15/173* (2006.01)
*H04L 12/841* (2013.01)
*H04L 12/801* (2013.01)
*H04L 12/721* (2013.01)
*H04L 12/707* (2013.01)
*H04L 12/727* (2013.01)
*H04L 12/761* (2013.01)

(52) U.S. Cl.
CPC ............ *H04L 47/283* (2013.01); *H04L 45/121* (2013.01); *H04L 45/127* (2013.01); *H04L 45/24* (2013.01); *H04L 47/127* (2013.01); *H04L 45/16* (2013.01); *H04L 45/22* (2013.01)

(58) Field of Classification Search
CPC ..... H04L 45/12; H04L 45/121; H04L 45/127; H04L 45/22; H04L 45/24

USPC ......... 709/203, 222, 223, 228, 230, 232, 239, 709/240, 242

See application file for complete search history.

(56) References Cited

U.S. PATENT DOCUMENTS 6,130,875 A  * 10/2000  Doshi et al. .................... 370/225
6,714,980 B1 *  3/2004  Markson et al. .............. 709/226
6,842,780 B1 *  1/2005  Frei et al. ...................... 709/221

(Continued)

FOREIGN PATENT DOCUMENTS

EP        0959601 B1    12/2005

OTHER PUBLICATIONS

Ding, et al., "CloudGPS: A Scalable and ISP-Friendly Server Selection Scheme in Cloud Computing Environments", 978-1-4673-1298-1/12, copyright 2012 IEEE.

(Continued)

*Primary Examiner* — Michael Y Won
(74) *Attorney, Agent, or Firm* — Edward J. Wixted, III

(57) ABSTRACT

In a method for directing a computer network request to process through one or more components, a processor identifies a plurality of input/output (I/O) paths capable of serving a computer network request and a plurality of components along each path of the plurality of I/O paths. A processor predicts resource demands at each respective component of the plurality of components along each path of the plurality of I/O paths. A processor estimates expected delay times at each respective component of the plurality of components along each path of the plurality of I/O paths using predicted resource demands at each component. A processor determines an expected delay time for each path of the plurality of I/O paths based on the expected delay times at each respective component of the plurality of components along each path of the plurality of I/O paths.

14 Claims, 3 Drawing Sheets

(56) References Cited

U.S. PATENT DOCUMENTS

| | | | |
|---|---|---|---|
| 6,894,991 B2* | 5/2005 | Ayyagari et al. | 370/325 |
| 6,973,622 B1* | 12/2005 | Rappaport et al. | 715/735 |
| 7,596,784 B2* | 9/2009 | Abrams et al. | 717/172 |
| 7,720,959 B2* | 5/2010 | Karam et al. | 709/224 |
| 7,739,099 B2* | 6/2010 | Liu et al. | 703/22 |
| 8,005,977 B2* | 8/2011 | Uhlemann | 709/233 |
| 8,204,986 B2 | 6/2012 | Wexler et al. | |
| 8,799,510 B2* | 8/2014 | Vasseur et al. | 709/239 |
| 2002/0045453 A1* | 4/2002 | Juttner et al. | 455/445 |
| 2002/0129157 A1* | 9/2002 | Varsano | 709/232 |
| 2002/0141346 A1* | 10/2002 | Garcia-Luna-Aceves et al. | 370/238 |
| 2003/0204587 A1* | 10/2003 | Billhartz | 709/224 |
| 2005/0228892 A1* | 10/2005 | Riley et al. | 709/228 |
| 2007/0002748 A1* | 1/2007 | Nakata et al. | 370/238 |
| 2008/0250135 A1* | 10/2008 | Pradhan et al. | 709/224 |
| 2008/0281961 A1* | 11/2008 | Niemczyk et al. | 709/224 |
| 2009/0185492 A1* | 7/2009 | Senarath et al. | 370/238 |
| 2009/0319977 A1* | 12/2009 | Saxena et al. | 716/13 |
| 2012/0005371 A1* | 1/2012 | Ravindran et al. | 709/242 |
| 2012/0144038 A1* | 6/2012 | Hildebrand | 709/226 |
| 2012/0198060 A1* | 8/2012 | Tan Ming Yu et al. | 709/224 |
| 2012/0278493 A1 | 11/2012 | Thornburgh et al. | |
| 2013/0007256 A1* | 1/2013 | Prieditis | 709/224 |
| 2013/0275567 A1* | 10/2013 | Karthikeyan et al. | 709/221 |
| 2014/0032730 A1* | 1/2014 | Fall et al. | 709/223 |

OTHER PUBLICATIONS

Dykes, et al., "An Empirical Evaluation of Client-side Server Selection Algorithms", IEEE INFOCOM, vol. 3, Mar. 2000, pp. 1361-1370.

* cited by examiner

PATH SELECTION FOR NETWORK SERVICE REQUESTS

FIELD OF THE INVENTION

The present invention relates generally to the field of processing service requests in a client-server based architecture, and more particularly to selecting specific components along an input/output (I/O) path to service a request.

BACKGROUND OF THE INVENTION

A software-defined data center is an architectural approach to information technology (IT) infrastructure that extends virtualization concepts to all of the data center's resources and services. In a software-defined data center, services such as networking, compute, and storage are pooled, aggregated, and managed by an intelligent, policy-driven software controller.

A proxy server is a server that acts as an intermediary for requests from clients seeking resources from other servers. A client may connect to a proxy server and request a service from a different server. The proxy server may evaluate the request as a way to simplify and control access to data and resources.

SUMMARY

Aspects of an embodiment of the present invention disclose a method, computer program product, and computing system for directing a computer network request to process through one or more components. A processor identifies a plurality of input/output (I/O) paths capable of serving a computer network request and a plurality of components along each path of the plurality of I/O paths. A processor predicts resource demands at each respective component of the plurality of components along each path of the plurality of I/O paths. A processor estimates expected delay times at each respective component of the plurality of components along each path of the plurality of I/O paths using predicted resource demands at each component. A processor determines an expected delay time for each path of the plurality of I/O paths based on the expected delay times at each respective component of the plurality of components along each path of the plurality of I/O paths.

DETAILED DESCRIPTION

Figure 1:
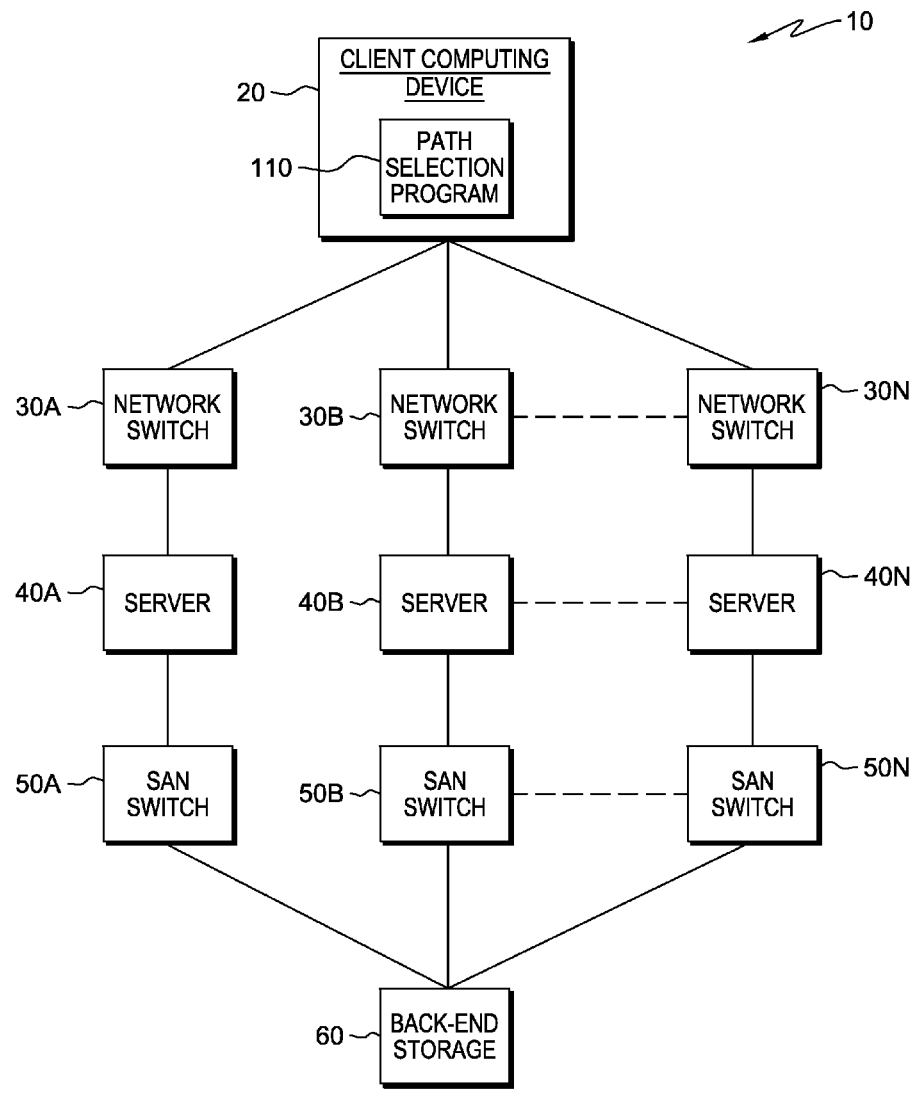
FIG. 1 depicts a diagram of a computing system in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures.

FIG. 1 depicts a diagram of computing system 10 in accordance with one embodiment of the present invention. FIG. 1 provides an illustration of one embodiment and does not imply any limitations with regards to the environments in which different embodiments may be implemented.

In the depicted embodiment, computing system 10 includes client computing device 20 and servers 40A-40N interconnected over one or more network switches 30A-30N. Computing system 10 also includes servers 40A-40N and back-end storage repository 60 interconnected via one or more storage area network (SAN) switches 50A-50N. In some embodiments, network switches 30A-30N, servers 40A-40N, SAN switches 50A-50N, and back-end storage 60 may make up all or a part of a software defined data center. A software-defined data center is an architectural approach to information technology (IT) infrastructure that extends virtualization concepts to all of the software-defined data center's resources and services. In a software-defined data center, services such as networking, compute, and storage are pooled, aggregated, and managed by an intelligent, policy-driven software controller.

Client computing device 20 may be a desktop computer, laptop computer, netbook computer, tablet computer, personal digital assistant (PDA), or smart phone. In general, client computing device 20 may be any electronic device or computing system capable of sending and receiving data and communicating with one or more of servers 40A-40N through one or more network switches 30A-30N. In the depicted embodiment, client computing device 20 includes path selection program 110. Client computing device 20 may include components, as depicted and described in further detail with respect to FIG. 3.

Network switches 30A-30N may each be computer networking devices that link network segments or network devices. In general, each of network switches 30A-30N is a computing networking device capable of linking client computing device 20 to any one or more of servers 40A-40N. In some embodiments, network switches 30A-30N each exist within a software-defined data center via software-defined networking. Software-defined networking allows for more effective management of networking services by decoupling the system that determines where traffic is sent from the underlying systems that forwards traffic to the selected destination. In some embodiments, software-defined networking may allow for a controller to specify and control different levels of prioritization in a networking switch when sending packets of information. For example, the controller may specify that certain designated high priority packets must be sent before processing lower priority packets.

Servers 40A-40N may each be management servers, web servers, or any other electronic devices or computing systems capable of receiving and sending data, in accordance with embodiments of the invention. In other embodiments, servers 40A-40N may each represent server computing systems utilizing multiple computers as a server system, such as in a cloud computing environment. In the depicted embodiment, software (not shown) on servers 40A-40N operate to fulfill service requests issued by software (not shown) on client computing device 20. In some embodiments, servers 40A-40N exist within a software-defined data center. Servers 40A-40N may include components, as depicted and described in further detail with respect to FIG. 3.

SAN switches 50A-50N may be computer networking devices that link network segments or network devices. SAN switches can connect to servers, storage devices, and other switches. In general, SAN switches 50A-50N may each be any computing networking device capable of linking back-end storage 60 to any one or more of servers 40A-40N. In some embodiments, SAN switches 50A-50N may exist within a software-defined data center via software-defined networking. In some embodiments, software-defined networking may allow for a controller to specify and control different levels of prioritization in a SAN switch when sending packets of information. For example, the controller may specify that certain designated high priority packets must be sent before processing lower priority packets.

Back-end storage 60 is a repository that may be written and read by software on client computing device 20 through one or more of servers 40A-40N. In one embodiment, back-end storage 60 is located on a server or computing device. In general, back-end storage 60 may be any storage system accessible to servers 40A-40N.

Path selection program 110 operates to select an I/O path to complete an operation in response to a received request. An I/O path is a physical path across a network topology. An I/O path may contain various components and connections between components that allow data to travel from a first location to a second location within the computer network. In the depicted embodiment, path selection program 110 operates to select an I/O path from client computing device 20 to back-end storage 60. For example, the selected I/O path may include network switch 30A, server 40A, and SAN switch 50A. Alternatively, the I/O path may include other network switches, servers, and/or SAN switches, such as network switch 30B, server 40B, and SAN switch 50B.

In some embodiments, path selection program 110 may monitor storage, compute, and networking levels within a software-defined data center to determine the optimum I/O path, or a list of optimum I/O paths, to efficiently perform the service request. In other embodiments, path selection program 110 may alternatively select one server from a plurality of servers and direct client computing device 20 to that server to handle the request. In some embodiments, path selection program 110 may monitor the software-defined data center according to historical data for each component, or by utilizing simulation software. In one embodiment, path selection program 110 resides on client computing device 20. In another embodiment, path selection program 110 resides on a proxy server (not shown). In such an embodiment, software (not shown) on client computing device 20 may initially send a request for a service, such as access to back-end storage 60, to the proxy server, and path selection program 110 will process the request and return to the software (not shown) on client computing device 20 a specific path or server address for executing the request. In other embodiments, path selection program 110 may reside on another server or another computing device, provided that path selection program 110 has access to resource availability information from network switches 30A-30N, servers 40A-40N, SAN switches 50A-50N, and back-end storage 60, and provided that path selection program 110 can communicate with software (not shown) on client computing device 20.

In some embodiments, computing system 10 may include additional client computing devices, networking switches, servers, SAN switches, and back end-storage not shown. While FIG. 1 depicts a number of particular paths connecting client computing device 20 to back-end storage 60, other embodiments of the invention may include paths with a fewer or greater number of components, as well as paths including multiple pathways. For example, in one embodiment, network switch 30B may be communicatively connected to both server 40A and server 40B. One with skill in the art may recognize that different organizational structures and types of components are contemplated by the present invention.

Figure 2:
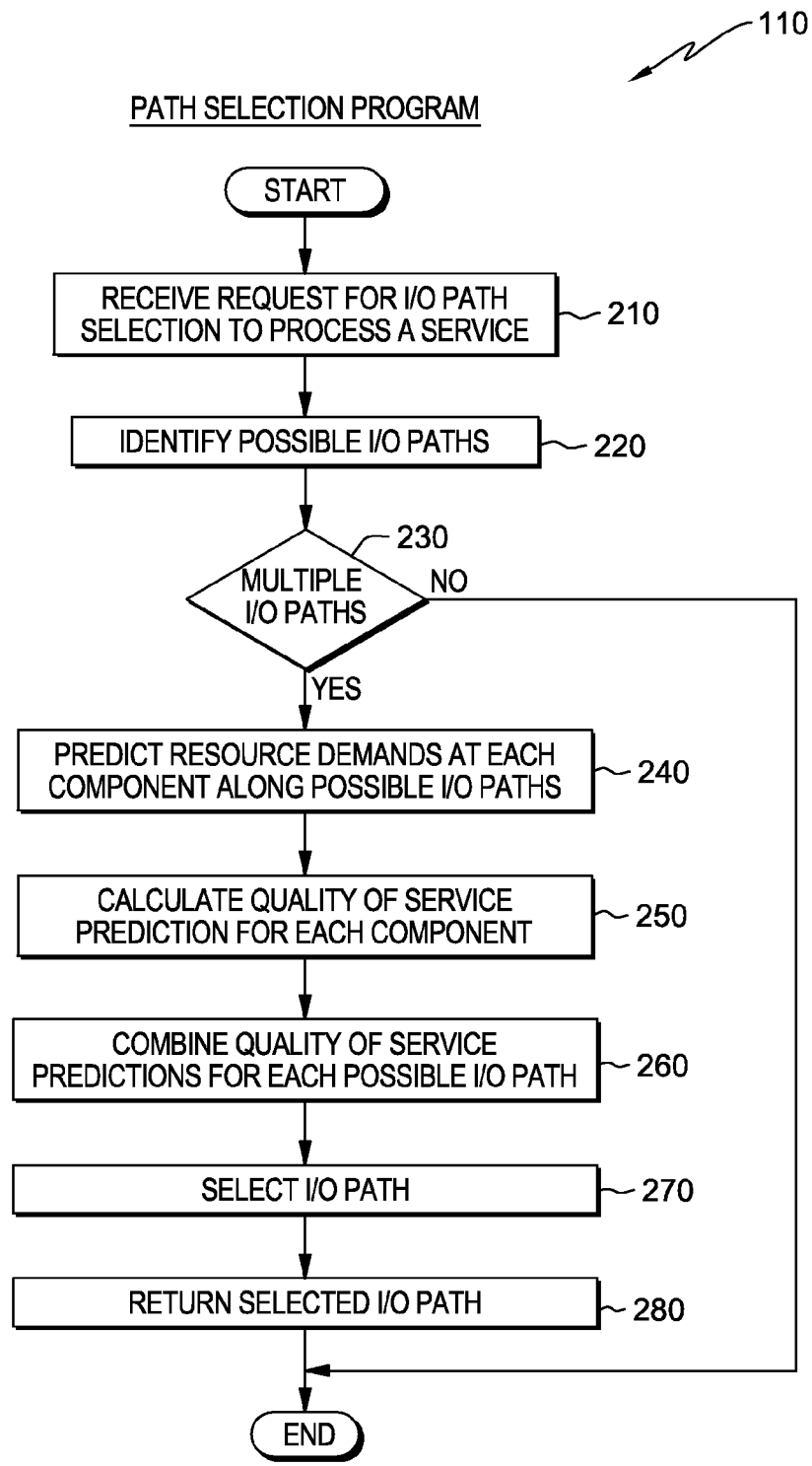
FIG. 2 depicts a flowchart of the steps of a path selection program executing within the computing system of FIG. 1, for selecting an input/output (I/O) path across a network in response to a service request.

FIG. 2 depicts a flowchart of the steps of path selection program 110 executing within the computing system of FIG. 1, in accordance with an embodiment of the present invention. Path selection program 110 identifies and selects an I/O path across a network in a client-server system according to demands at each component along each possible I/O, in accordance with one embodiment of the present invention. In some embodiments path selection program 110 may select a particular server, network switch, and/or SAN switch, rather than determining an entire I/O path to process the request.

In step 210, path selection program 110 receives a request to select an I/O path in order to process a service request. In some embodiments, the request may specify that path selection program 110 return the address or name of a specific server or location of another component, rather than specifying the entire I/O path from client computing device 20 to back-end storage 60 or another similar end location. Path selection program 110 may receive the request from client computing device 20, or an application or program that resides on client computing device 20. In other embodiments, path selection program 110 may reside on a proxy server and client computing device 20 may send such a request to the proxy server across a network.

In step 220, path selection program 110 identifies all possible I/O paths available to process the request. In the embodiment depicted by FIG. 1, each possible I/O path begins with client computing device 20 and ends with back-end storage 60. In the depicted embodiment, each path will pass through various components, such as network switches 30A-30N, servers 40A-40N, SAN switches 50A-50N, and potentially other components (not shown). In some embodiments, individual components may each have connections to more than one other component, where each connection may individually provide a path to the desired endpoint, such as back-end storage 60 in the depicted embodiment. In an embodiment that includes a multi-server architecture, path selection program 110 may identify all possible I/O paths through each individual server. In such an embodiment, path selection program 110 may merely select and direct client computing device 20 to a particular server to process the request, rather than specifying each route to take along the entire I/O path. In one embodiment, path selection program 110 may identify all possible I/O paths, such as when I/O path components (e.g., network switch 30A, server 40B, etc.) reside within a software-defined data center. In a software-defined data center, compute, networking, and storage components may share information and capabilities in a unified manner.

In decision 230, path selection program 110 determines if multiple I/O paths exist that are able to process the request. In another embodiment, path selection program 110 may determine if multiple servers exist that are able to assist in processing the request. If there is only a single I/O path or, as in the alternate embodiment, there is only one server that can assist in processing the request (decision 230, no branch), the function is complete and the request will be processed through to the one possible I/O path or server.

If there are multiple I/O paths or multiple servers, such as servers 40A-40N, that can process the request (decision 230, yes branch), path selection program 110 will predict resource demands at each component along the possible I/O paths (step 240). In one embodiment, path selection program 110 may only select a particular server through which to process the request, such as one of the servers 40A-40N. In another embodiment, path selection program 110 may select a list of servers through which to process the request, and may order the list in descending order of efficiency. In each of these embodiments, path selection program 110 may still predict resource demands at each component along the possible I/O paths to determine potential bottlenecks at other components (i.e., components other than servers 40A-40N) along the possible I/O paths.

In one embodiment, path selection program 110 may predict resource demands at each component along the possible I/O paths by accessing historical data for each component. In other embodiments, path selection program 110 may monitor and record resource data for each component within the software-defined data center. In yet other embodiments, path selection program 110 may access simulation information based upon the particular device type and loads experienced to predict resource demands. For example, at the networking level, network monitoring tools can deliver projected loads based on information obtained about the predicted network traffic. At the storage level, disk performance modeling tools may consider the type of storage device(s), the expected input/output per second (IOPS) load, among other storage related parameters.

In step 250, path selection program 110 calculates a delay prediction for each component along the possible I/O paths. The delay prediction is a function that denotes the expected delay in processing the service request at that specific component along the I/O path. Because different components may create delays due to different factors, the delay prediction will take into account these different factors and normalize the delay so that it may adequately be compared to other components along the I/O path. For example, a network switch, such as one of the network switches 30A-30N, may have an increased delay due to packet arrivals and a high level of network traffic. At the computing level, a server, such as one of the servers 40A-40N may have an increased delay due to projected compute load due to processing a large number of requests. At the storage level, the SAN switch or storage controller may experience delays due to a large IOPS load, as well as because of other storage related parameters.

In embodiments that utilize paths involving a software-defined data center, the delay prediction for each component along the possible I/O paths may further consider priority settings associated with the request. For example, a system that utilizes a software-defined data center may allow a user or application to designate a request as high, low, or some other priority level. In calculating the delay prediction, path selection program 110 may use the associate priority setting as a factor, along with the component-specific delay-causing factor.

For example, the delay at network switch 30A ($d_N$) may be a function of the predicted packet arrivals at network switch 30A and service level associated with the request ($f_N$(packet arrivals, low)). Thus, $d_N$=$f_N$(packet arrivals, low). Rather than packet arrivals, the delay at server 40A ($d_C$) may be a function of the server load and service level associated with the request, and the delay at SAN switch 50A ($d_S$) may be a function of TOPS and the service level associated with the request. Each function may normalize the resulting delay at the component, so that the delay at a network switch can be compared to the delay at a server, SAN switch, or other component along the possible I/O paths.

Once all of the delays at each component along an I/O path have been calculated the delay prediction for the entire I/O path can be predicted by combining the delay at each component along the I/O path (step 260). For example, the entire I/O path delay ($d_{I/O}$) for the example above may be represented by the following formula: $d_{I/O}$ (low)=$d_N$+$d_C$+$d_S$. This calculation can be made for each I/O path that can process the request, and the I/O paths can be compared.

In some embodiments, the delay prediction calculation may further consider the predicted delay if the request was elevated to high priority. A request may be elevated to high priority due to unforeseen latency or bandwidth issues, due to imprecise load estimations along the I/O path. In one embodiment, to accomplish this calculation, path selection program 110 may repeat step 250 for each component, but change the service level factor from the service level associated with the request to at least one of the higher priority service level. Once the delay at each component is calculated based on the high priority service level, path selection program 110 may repeat step 260 to determine $d_{I/O}$ (high) for each possible I/O path. In one embodiment, once the delay prediction calculation has been performed for both the associated priority (here we will assume this is low), and the high priority, the two calculations may be combined to for a unified comparison metric according to the following formula: weighted delay =(1−α)*$d_{I/O}$(high)+α*$d_{I/O}$(low). In the formula, the parameter α may represent a confidence factor representing the confidence in the estimated delay times. Here α may be a value from 0 to 1 where 0 indicates no confidence and 1 indicates 100% confidence in the estimated delay times. Factors that may cause a user to adjust this confidence factor might include the potential for unexpected resource demands, as well as historical inaccuracies.

In step 270, path selection program 110 selects an I/O path to service the request. Path selection program 110 may select the I/O path by comparing the results of either the weighted delay formula or the entire I/O path results of each possible I/O path. In some embodiments, the I/O path with the shortest weighted delay. In other embodiments, rather than selecting a single I/O path, path selection program 110 may select multiple I/O paths, each of which have a small weighted delay, or alternatively are within a threshold weighted delay time as specified by a user or administrator. In such an embodiment, path selection program 110 may sort the possible I/O paths according to the weighted delay.

In step 280, path selection program 110 returns the selected path or paths to client computing device 20 and/or the requesting program or application. Returning the selected path may include providing instructions, names, and/or addresses of the applicable network switches, servers, SAN switches, or other components along the I/O path. Once path selection program I/O returns the selected path, the program's execution is complete.

While the previous steps describe selecting I/O paths, it should be noted that a similar process may be used to select individual components along an I/O path. For example, rather than selecting each component along the I/O path, path selection program 110 may only direct client computing device 20 to a particular server, such as server 40B, by providing a name and/or address of the server. In such a scenario, client computing device 20 will connect to server 40B according to currently utilized procedures.

Figure 3:
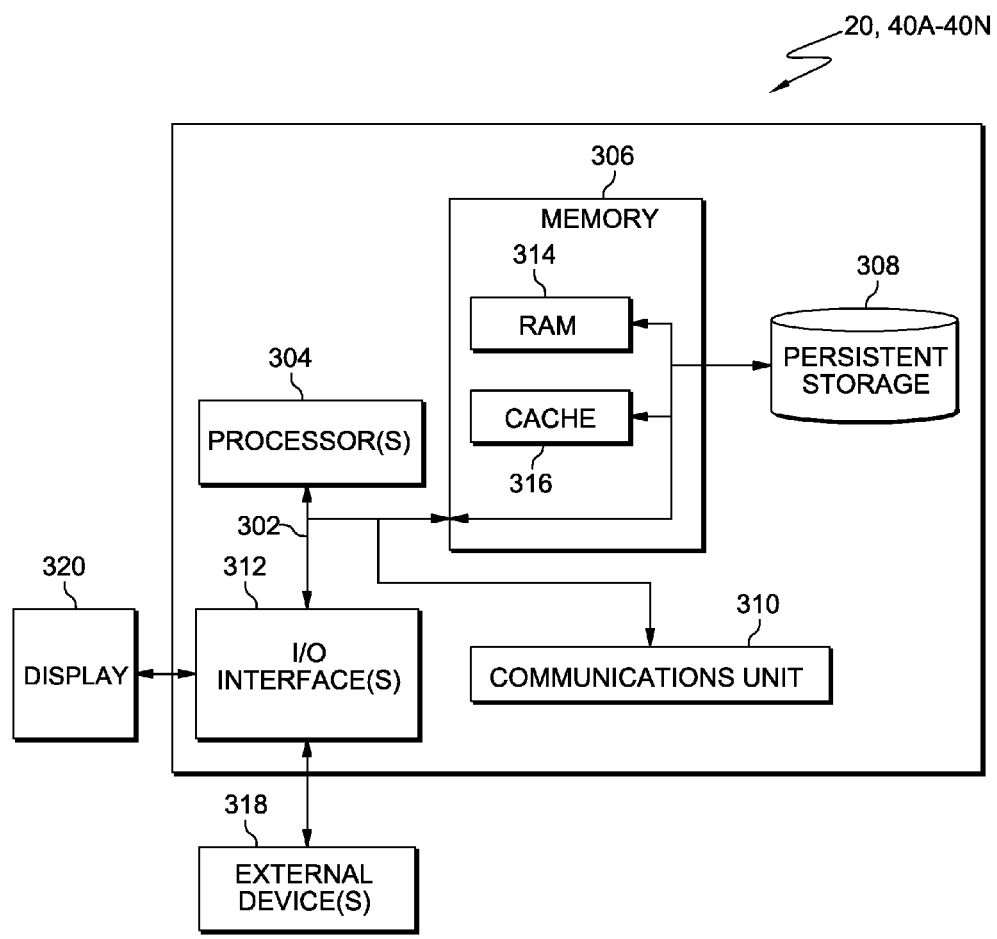
FIG. 3 depicts a block diagram of components of the client computing device of FIG. 1 in accordance with one embodiment of the present invention.

FIG. 3 depicts a block diagram of components of client computing device 20 and servers 40A-40N in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Client computing devices 20 and servers 40A-40N each include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Path selection program 110 is stored in persistent storage 308 of client computing device 20 for execution by one or more of the respective computer processors 304 of client computing device 20 via one or more memories of memory 306 of client computing device 20. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Path selection program I/O may be downloaded to persistent storage 308 of client computing device 20 through communications unit 310 of client computing device 20.

I/O interface(s) 312 allows for input and output of data with other devices that may be connected to computing system 10. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., path selection program 110 can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for directing a computer network request to process through one or more components, the method comprising:
   identifying, by one or more processors, a plurality of input/output (I/O) paths capable of serving a computer network request and a plurality of components along each path of the plurality of I/O paths, wherein the computer network request has an associated first priority setting, and wherein one or more of the plurality of components along each path of the plurality of I/O paths are located within a software-defined data center;
   predicting, by the one or more processors, resource demands at each respective component of the plurality of components along each path of the plurality of I/O paths;
   estimating, by the one or more processors, expected delay times at each respective component of the plurality of components along each path of the plurality of I/O paths using predicted resource demands at each component and the first priority setting; and
   determining, by the one or more processors, an expected delay time for each path of the plurality of I/O paths based on the expected delay times at each respective component of the plurality of components along each path of the plurality of I/O paths.

2. The method of claim 1, further comprising:
   determining, by the one or more processors, a path of the plurality of I/O paths that has the shortest expected delay time; and
   causing the request to process through the path of the plurality of I/O paths that has the shortest expected delay time.

3. The method of claim 1, wherein the step of estimating, by the one or more processors, expected delay times at each respective component of the plurality of components further includes using a second received priority setting of the request, wherein the second received priority setting of the request is of a higher priority than the first received priority setting of the request.

4. The method of claim 3, further comprising:
   adjusting, by the one or more processors, the expected delay time for each path of the plurality of I/O paths based on, at least, the second priority setting of the request, and a confidence factor, wherein the confidence factor indicates an expected accuracy of the expected delay time.

5. The method of claim 4, wherein the confidence factor is based on, at least, historical inaccuracies.

6. The method of claim 1, wherein the plurality of components includes at least one server, at least one network switch, and at least one software area network (SAN) switch.

7. The method of claim 6, wherein the step of estimating, by the one or more processors, expected delay times at each respective component of the plurality of components further comprises:
   normalizing, by the one or more processors, factors that may cause delays in each server, network switch, and SAN switch of the plurality of components to compare expected delay times among dissimilar components of the plurality of components.

8. A computer program product for directing a computer network request to process through one or more components, the computer program product comprising:
   one or more computer-readable storage devices and program instructions stored on the one or more computer-readable storage devices, the program instructions comprising:
   program instructions to identify a plurality of input/output (I/O) paths capable of serving a computer network request and a plurality of components along each path of the plurality of I/O paths, wherein the computer network request has an associated first priority setting, and wherein one or more of the plurality of components along each path of the plurality of I/O paths are located within a software-defined data center;
   program instructions to predict resource demands at each respective component of the plurality of components along each path of the plurality of I/O paths;
   program instructions to estimate expected delay times at each respective component of the plurality of components along each path of the plurality of I/O paths using predicted resource demands at each component and the first priority setting; and
   program instructions to determine an expected delay time for each path of the plurality of I/O paths based on the expected delay times at each respective component of the plurality of components along each path of the plurality of I/O paths.

9. The computer program product of claim 8, further comprising:

program instructions, stored on the one or more computer-readable storage media, to determine a path of the plurality of I/O paths that has the shortest expected delay time; and program instructions, stored on the one or more computer-readable storage media, to cause the request to process through the path of the plurality of I/O paths that has the shortest expected delay time.

10. The computer program product of claim 8, wherein program instructions to estimate expected delay times at each respective component of the plurality of components further includes using a second received priority setting of the request, wherein the second received priority setting of the request is of a higher priority than the first received priority setting of the request.

11. The computer program product of claim 8, wherein the plurality of components includes at least one server, at least one network switch, and at least one software area network (SAN) switch.

12. A computer system for directing a computer network request to process through one or more components, the computer system comprising:

one or more computer processors, one or more computer-readable storage media, and program instructions stored on the computer-readable storage media for execution by at least one of the one or more processors, the program instructions comprising:

program instructions to identify a plurality of input/output (I/O) paths capable of serving a computer network request and a plurality of components along each path of the plurality of I/O paths, wherein one or more of the plurality of components along each path of the plurality of I/O paths are located within a software-defined data center;

program instructions to predict resource demands at each respective component of the plurality of components along each path of the plurality of I/O paths;

program instructions to estimate expected delay times at each respective component of the plurality of components along each path of the plurality of I/O paths using predicted resource demands at each component;

program instructions to determine an expected delay time for each path of the plurality of I/O paths based on the expected delay times at each respective component of the plurality of components along each path of the plurality of I/O paths;

program instructions to determine a path of the plurality of I/O paths that has the shortest expected delay time; and program instructions to cause the request to process through the path of the plurality of I/O paths that has the shortest expected delay time.

13. The computer system of claim 12, wherein program instructions to estimate expected delay times at each respective component of the plurality of components further includes using a first received priority setting of the request.

14. The computer system of claim 13, wherein program instructions to estimate expected delay times at each respective component of the plurality of components further includes using a second received priority setting of the request, wherein the second received priority setting of the request is of a higher priority than the first received priority setting of the request.

* * * * *